March 6, 1934. O. V. PAYNE Re. 19,100

WEFT END CONTROLLER FOR WEFT REPLENISHING LOOMS

Original Filed Aug. 28, 1930 3 Sheets-Sheet 1

INVENTOR
OSCAR V. PAYNE
Fauntleroy Fay & Hardy
ATTORNEYS

March 6, 1934. O. V. PAYNE Re. 19,100

WEFT END CONTROLLER FOR WEFT REPLENISHING LOOMS

Original Filed Aug. 28, 1930 3 Sheets-Sheet 2

INVENTOR
OSCAR V. PAYNE
Sewell Hyde Fay & Hanby
ATTORNEYS

WEFT END CONTROLLER FOR WEFT REPLENISHING LOOMS

Original Filed Aug. 28, 1930 3 Sheets-Sheet 3

INVENTOR
OSCAR V. PAYNE
Smith Hyde Fay & Hardy
ATTORNEYS

Reissued Mar. 6, 1934

Re. 19,100

UNITED STATES PATENT OFFICE 19,100

WEFT END CONTROLLER FOR WEFT REPLENISHING LOOMS

Oscar V. Payne, Worcester, Mass., assignor to Crompton & Knowles Loom Works, Worcester, Mass., a corporation of Massachusetts Original No. 1,842,731, dated January 26, 1932, Serial No. 478,429, August 28, 1930. Application for reissue December 19, 1933, Serial No. 703,159

37 Claims. (Cl. 139—247)

This invention relates to devices for controlling the weft ends of reserve bobbins in weft replenishing looms and it is the general object of the invention to provide an improved device of this type which will be driven by an efficient actuator and hold the weft ends taut without subjecting them to sufficient strain to break them.

In multicolor weft replenishing looms the reserve bobbins are held in a plurality of stacks and have their weft ends attached in one way or another to a so-called thread holder. At the time of transfer the weft end is held so that as the shuttle is picked its eye is partially threaded. It is found that as bobbins await transfer they tend to rotate on their axes due to vibration of the loom, resulting in slackness of certain weft ends and tightness of others. The slack threads are likely to fall into the path of the lay and become broken so that the shuttle will not be threaded at the time of transfer. It is an important object of my present invention to make use of the vibration which rolls the bobbins to keep the weft ends taut.

During operation of an automatic loom the outer part of the magazine frame is observed to vibrate, due probably to the motions of the lay and picking mechanism. In most looms the crank arms from the crank shaft do not lie in the plane of the loom sides and there is as a result of this construction a slight horizontal bending of the loom frame in the direction of movement of the lay. The picking, on the other hand, subjects the loom sides to vibrations in a vertical direction. It is an important object of my present invention to actuate a traveling weft end engaging surface by a vibration motor having a weighted mass suspended to respond to the vibrations of the loom and operatively connected to the surface through some transmitting agent such as a pawl. Experience shows that vibration in a horizontal direction is greater in some looms than in the vertical vibration, and I accordingly mount the weighted mass so that it can move horizontally, although it is to be understood that effective results have been and can be accomplished by disposing the weighted mass to move vertically. The weight is preferably mounted so as to move in a direction perpendicular to the lay, and is free to respond to the vibration of the loom frame.

Another object of my invention relates to a device to vary the extent of movement of the weighted mass so that the rate of revolution of the revolving parts may be altered depending upon the character of goods being woven.

The usual magazine has an outside plate for the tips of the bobbins and it is a further object of my invention to support the moving parts of my improved thread controller in such a way that the device itself will assist in the vibratory movement of the weighted mass, preferably by having the support which attaches the device to the magazine plate connected at one side of the center of gravity of the device.

It is a further object of my invention to provide a pair of traveling surfaces which move so as to cause the weft ends to follow a tortuous path but which at no time have tight binding engagement with each other or with the weft ends between the two surfaces. With this construction, the weft ends are subjected to a slight combing action which does not disturb the fibers of the threads or abrade them with resultant breakage. The device described herein is capable of straightening out one slack thread which may be part of a group of threads, the remainder of which are all substantially straight. Such a condition might result at the time of transfer when a bobbin drops from its cradle to the bobbin supports. As a result of the combing action referred to, the weft ends may be simply dropped by the operator between the traveling surfaces, without requiring the wrapping or winding of the ends about some portion of the thread holder.

In the preferred form of my invention, I use two rotary gear-shaped devices having parallel axes and with their free ends remote from the weft magazine, so as to provide a downwardly extending notch into which the weft ends may be dropped.

In one form of my invention, I use slightly tapered or conical gear-shaped devices, and in this connection it is another object of my invention to provide a guard which can be moved in a direction parallel to the axes of said devices, so that when relatively fine yarns are being woven they may be permitted to fall between the larger portions of the rotary devices, whereas when coarse yarns are being woven the guard may be moved to permit them to be engaged by smaller parts of said devices, so that the take-up will be correspondingly less. In this connection it will be noted that the circumference of the rotating parts is decreased at the same time that the crimping or tortuous deformation of the weft ends is lessened.

With these and other objects in view which will appear as the description proceeds, my invention resides in the combination and arrangement of parts hereinafter described and set forth in the claims.

In the accompanying drawings, wherein three forms of my invention are set forth—

Figure 1:
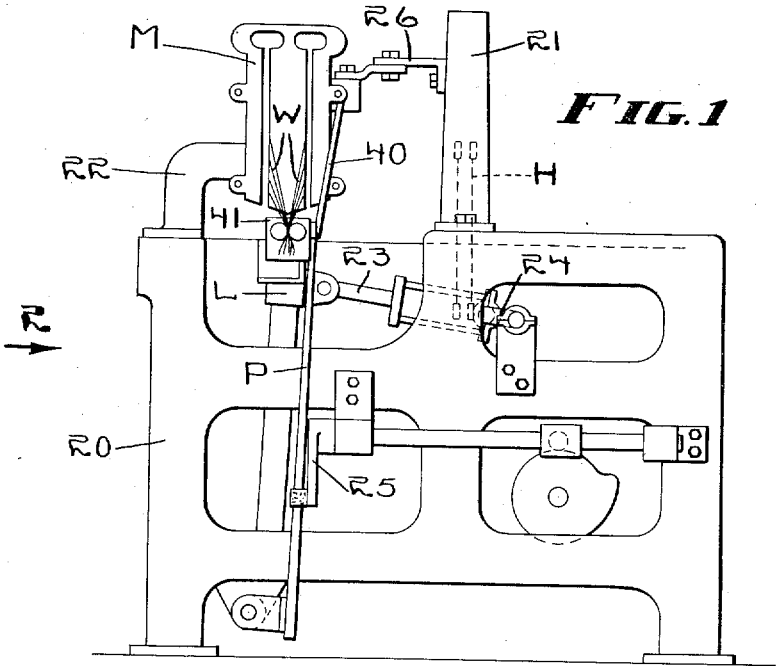
Fig. 1 is an end elevation of a loom having the preferred form of my improved thread controller attached thereto.
Figure 2:
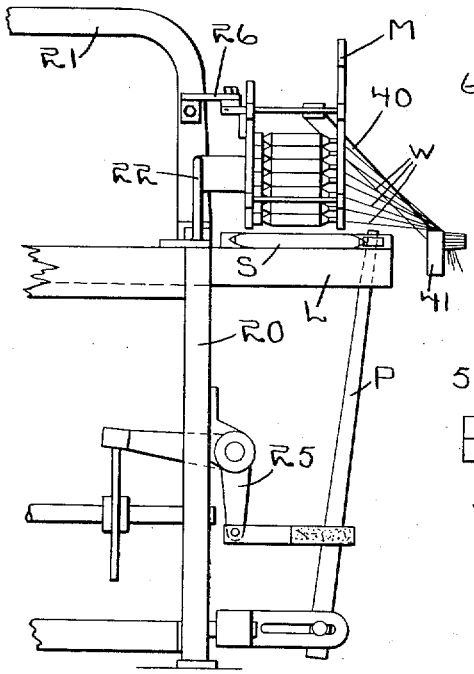
Fig. 2 is a front elevation taken in the direction of arrow 2, Fig. 1.

Referring to Figs. 1 and 2, I have shown loomsides 20 having an arch 21, and a multicolor magazine designated generally at M supported by a foot 22 secured to the front post of the loomside. The lay L swings back and forth in the loom and is driven by connectors 23 between the loomsides, and attached to a crank shaft 24 extending across the loom parallel to the lay. A picker stick P may be actuated by any mechanism designated at 25 herein and the loom may be provided with harnesses H which may be raised and lowered by any approved mechanism not shown herein, such, for instance, as the Knowles head, a dobby or cams.

As shown in Fig. 2, the magazine projects beyond the adjacent loomside and is connected to the arch by brace 26. The magazine is arranged to support a number of reserve bobbins which have their tips extended outwardly and from which project weft ends W. The bobbins lie loosely stacked in guideways and descend by gravity toward transfer position.

The lay swings as usual by power transmitted from the crank shaft through the connectors and the latter will ordinarily lie between the loomsides. As the lay reaches the mid-position in its rearward stroke the picking motion will come into action to propel the shuttle across the loom. The harnesses operate as usual to define the shed lines and these three mechanisms, together with other motions not set forth herein, contribute to the vibrational disturbance which is characteristic of all looms and causes the magazine to vibrate slightly while the loom is in motion. The movements of the magazine are probably the resultants of several different vibrations, but in the three forms of the invention set forth hereinafter I make use of the horizontal vibrational force which is substantially perpendicular to the lay.

Secured to the magazine is a downwardly and outwardly extending holder 40 to which is clamped a box-like structure or casing 41 having an outer web 42 with an integral inwardly projecting deep flange 43 across the edges of which lies a removable plate 44. Extending through the upper part of the web 42 are two substantially similar parallel and horizontally spaced shafts 45 each of which has a collet 46 to engage the web on the outer surface thereof and having a shoulder 47 projecting through a hub 48 formed as part of the web. The shafts are each reduced as at 49 and have mounted thereon gears 50, one for each shaft. These gears are equal and mesh with each other, being the means by which the shafts are caused to rotate in unison.

Figure 4:
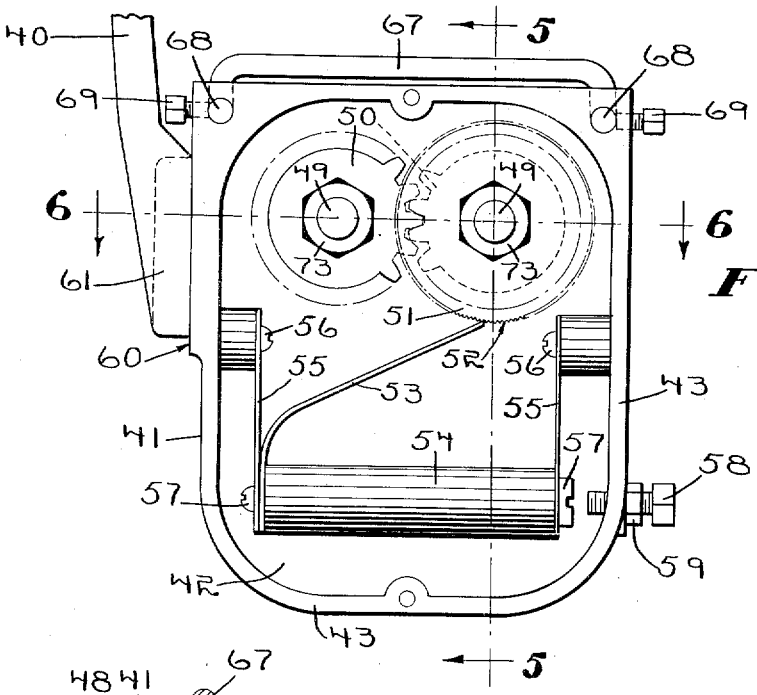
Fig. 4 is a view of the structure shown in Fig. 3 but from the opposite side and with the cover plate removed.

One of said shafts, the one to the right as viewed in Fig. 4, has mounted thereon and rotating therewith a ratchet wheel 51 having very fine teeth 52 which co-act with a spring pawl 53. The latter moves with a weighted mass 54 suspended at its ends by two tempered steel spring links 55. The upper ends of the links are attached to the flange 43 by screws 56 and the lower ends are connected to the cylinder by means of screws 57. The pawl is normally pressed upwardly against the teeth 52 by its own resilience and is preferably secured in position by one of the screws 57, as shown in Fig. 4. A stop screw 58 extends through the flange to engage one of the screws 57 and may be held in adjusted position by a lock nut 59.

The outer part of the flange 43 is provided with a bearing surface 60 which receives the foot 61 of the arm 40, said foot being located to one side of the center of gravity of the casing and parts carried thereby. This latter relation is thought to aid the operation of the device, although I do not believe it to be essential.

A nut 73 on the reduced end 49 of one of the shafts clamps the ratchet frictionally against the corresponding gear 50. In order to permit this clamping action, that part of the shaft which lies between the collet 46 and the shoulder 47 is slightly longer than the bearing defined by hub 48. Rotary movement of the ratchet wheel will therefore be conveyed to the gear wheels and these in turn will revolve the shafts in opposite directions and in equally timed relation.

When the loom is at rest the weight will be stationary, with the spring links either under no strains, or at least those which are balanced. As the loom starts to run the magazine and casing will move slightly in one direction due to vibration. The inertia of the weight resists this motion, thereby placing the spring suspension links under strains which tend to cause the weight to follow the casing. The weight thereupon starts to move in the same direction as the casing, but presently the latter starts to move in the reverse direction. The momentum of the weight continues its movement, however, straining the spring links in the opposite direction. They overcome the momentum and start the weight to move back in the opposite direction. At about this time the casing again reverses its motion, and the effects already described take place in the opposite direction. This action continues during loom operation, lagging behind the movements of the casing. Alternate movements of the weight cause the pawl to actuate the ratchet wheel and shafts, while the intervening motions are idle. The amount of movement of the pawl and shafts is determined by the position of stop screw 58 which may be regulated according to the loom speed or yarn used.

The parts located in the casing constitute in effect a vibration motor to revolve the shafts 45, and may be the same in all three forms of weft end engaging traveling devices or surfaces to be set forth hereinafter.

Figure 5:
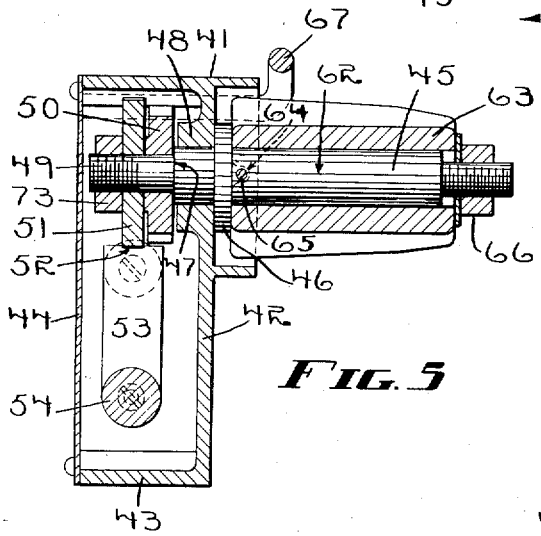
Fig. 5 is a vertical section on line 5—5 of Fig. 4.

In the preferred form of the invention each shaft 45 has an outwardly extending cylindrical part 62 on which is mounted a tapered fluted roll 63 having a notch 64 to receive a driving pin 65 extending through and secured to the shaft. The right-hand ends of the shafts as viewed in Fig. 5 are threaded and carry nuts 66 which hold the rollers 63 in engagement with the pins 65.

A weft end guard 67 has a pair of spaced parallel arms 68 which extend into the flange and may be secured therein by a screw 69. The arms 68 are parallel to the shafts and are of sufficient length to permit the guard, which extends transversely over the fluted rolls, to assume different positions with respect to the latter.

Figure 3:
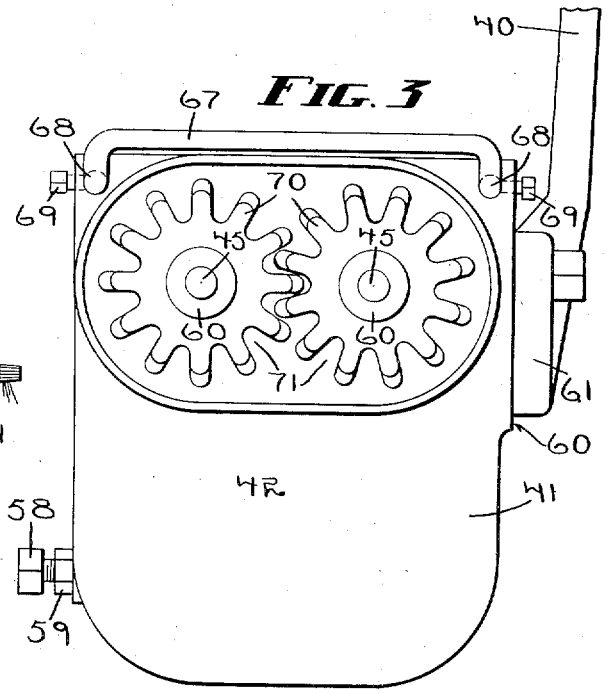
Fig. 3 is an enlarged side elevation of the form of the invention shown in Figs. 1 and 2.

An important relation exists between the flutes or teeth 70 and the slots 71 between them, as shown in Fig. 3. These slots are larger than the teeth and the teeth of each roll fit relatively loosely in the slots or spaces of the other roll.

Figure 6:
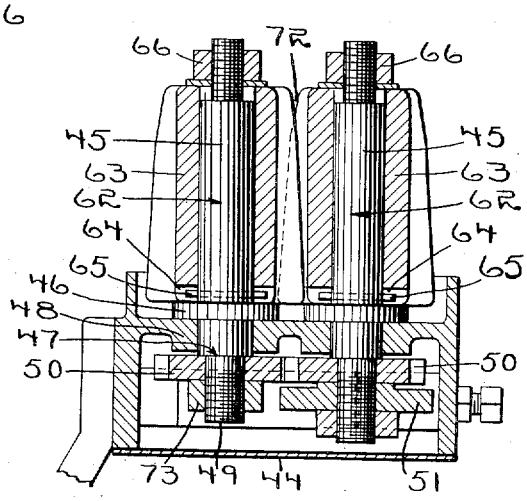
Fig. 6 is a horizontal section on line 6—6 of Fig. 4.

As shown in Fig. 6, a V-shaped opening 72 is defined between the two rolls 63, when tapered, and as seen in Fig. 3, an upwardly opening notch 73 is defined between the rolls 63, in which notch 73 the weft ends W may be placed or into which they may be allowed to fall by gravity when bobbins are added in the magazine. Rotation of the rolls will eventually draw the threads down to the position suggested in Fig. 2, this action of the rolls resulting from the fact that the axes of the rolls are in substantially the same horizontal plane and that the upper surfaces of the rolls move toward each other.

It is thus unnecessary for the operator to manually insert the weft ends between the rolls. As the free ends of the rolls project away from the magazine, the weft ends tend to move by gravity toward the casing 41 and into position to be frictionally engaged by the rolls 63.

As the shafts 45 rotate as previously described the pins 65 will drive the fluted rollers so that the teeth of one will enter the grooves 71 of the other without firmly contacting with the teeth of said other, and the weft ends will therefore be subjected to a frictional downward force exerted by the teeth without being pinched between the teeth. By having the gears 50 frictionally held to the shafts, a slight turning of one of the fluted rollers on its own shaft may be produced in order to effect the correct relation between the teeth and slots of the rollers.

Figure 7:
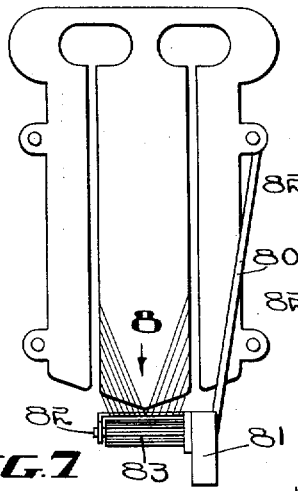
Fig. 7 is a side elevation of the first modification.
Figure 8:
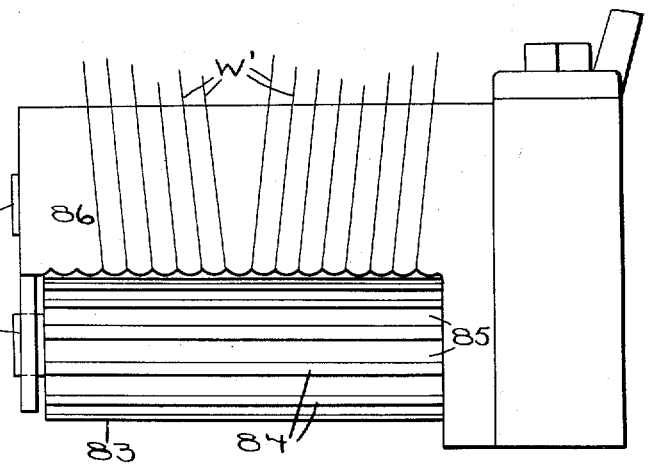
Fig. 8 is a top plan view taken in the direction of arrow 8, Fig. 7.

In the first modification of the invention shown in Figs. 7 and 8 I employ an arm 80 similar to arm 40 and provide a casing 81 equipped with a vibration motor substantially similar to those already described to rotate a pair of shafts 82 similar to shafts 45. Fluted rollers 83 are mounted on and rotate with the shafts 82 and have teeth 84 which enter loosely in the slots 85. In this instance I provide an extension from the housing 81 in the form of a notched or scalloped guard 86 by which the weft ends W′ may be guided. The scalloped edge lies above the notch between the two rolls so that each individual thread if desired may be subjected to the combing action of the teeth without being surrounded by other threads.

In this modification of the invention also the weft ends may, if desired, be thrown loosely into the notch between the rolls, rotation of the latter due to vibration of the loom in time straightening out the weft ends and holding them taut.

Figure 9:
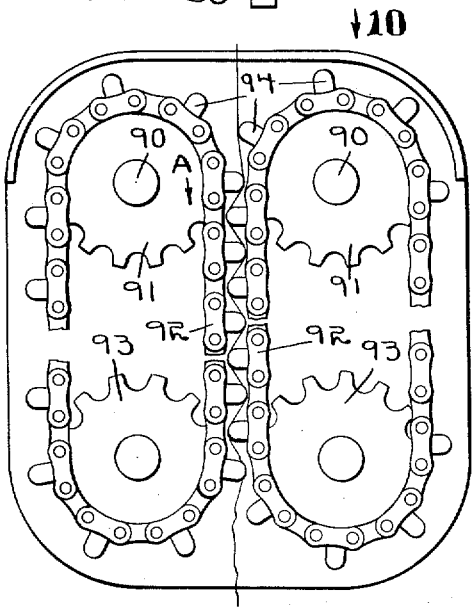
Fig. 9 is a side elevation of the second modification.
Figure 10:
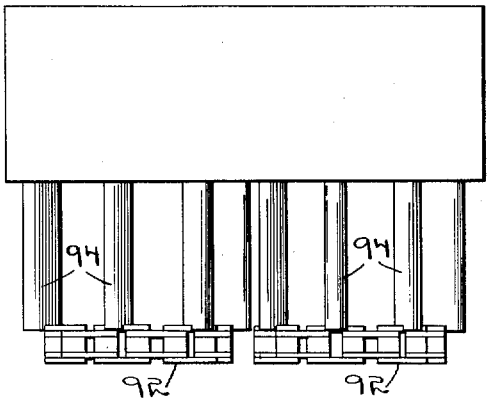
Fig. 10 is a front elevation taken in the direction of arrow 10, Fig. 9.

In the second modification shown in Figs. 9 and 10 shafts 90 corresponding to shafts 45 of the preferred form carry driving sprockets 91 each of which has thereon an endless belt 92, the lower end of which is guided around a guide sprocket 93. The belts are provided with deflectors 94 which as shown in Fig. 9 are alternately offset so that the weft engaging part of the deflectors on the right-hand belt will lie to the left of a vertical line lying centrally between the axes 90, whereas the corresponding parts of the deflectors on the left belt will lie to the right of such a line. In this way a tortuous or zigzag path is provided for the weft, the ends being dropped loosely into the spaces above the vertical portions of the belt and being engaged by the deflectors as they move in the direction of arrow A, Fig. 9. In this form of the invention a greater amount of strain can be placed on the threads or weft ends, depending upon the length of the belts and also the number of deflectors which are in engagement with the weft ends at any one time.

Figure 11:
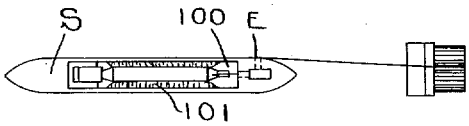
Fig. 11 is a diagrammatic view of the shuttle and holder.

The loom operates with a shuttle S which may be of any approved form and as shown in Fig. 11 may have an eye E and a bobbin chamber 100 which in the case of silk shuttles will be lined with fur designated at 101. In any case there will be some resistance offered to the unwinding of weft on the pick following transfer, even though the shuttle be not completely threaded, and it is important to note that the frictional strain exerted by the flutted roles on the weft end will ordinarily exceed the resistance offered to the unwinding of the freshly transferred bobbin by whatever form of tension is present in the shuttle. In other words, at the time of picking after transfer there are two frictional devices acting upon the weft end extending from the bobbin, one being any of the forms of thread controller set forth herein, and the other being the shuttle tension. The tension exercised by the thread controller must exceed that offered by the shuttle.

From the foregoing it will be seen that I have provided a very simple actuator for a thread controller dependent for its operation upon loom vibration, a suspended mass being responsive to movements of a support which in turn oscillates freely under a vibration. Also, the weft ends are subjected to a gentle frictional force which holds them taut without danger of breakage. The conical thread rollers and guard afford ready means for varying the amount of take-up by altering the effective roll diameter and the degree of bending. Again, the frictional drive of the rollers permits manual adjustments to insure proper relation between the teeth and slots. Furthermore, a notched or scalloped edge may be used to separate the weft ends, although this is not necessary. Where a greater tension is needed belts with deflectors may be employed.

Having thus described my invention it will be seen that changes and modifications may be made therein by those skilled in the art without departing from the spirit and scope of the invention and I do not wish to be limited to the details herein disclosed, but what I claim is:—

1. In a weft replenishing loom having reserve bobbins from which extend weft ends, a thread controller having a moving surface to engage and keep taut the weft ends and actuated by free loom vibration.

2. In a weft replenishing loom having reserve bobbins from which extend weft ends, a traveling surface to engage the weft ends and actuated by free loom vibration.

3. In a weft replenishing loom having reserve bobbins from which extend weft ends, a moving surface to engage and straighten the weft ends, said surface being actuated by free loom vibration.

4. In a weft replenishing loom having reserve bobbins from which extend weft ends, movable devices to engage and straighten the weft ends, and a vibration motor operatively connected to said devices to move the same and dependent for its motive power on loom vibration.

5. In a weft replenishing loom having reserve bobbins from which extend weft ends, a vibration motor supported by and deriving its operating force from the vibration of the loom, and means actuated by the motor to keep the weft ends taut.

6. In a weft replenishing loom having reserve bobbins from which extend weft ends, a vibration motor including a suspended weighted mass capable of limited movement induced by vibration of the loom, and a device actuated by the motor to keep the weft ends taut.

7. In a weft replenishing loom having reserve bobbins from which extend weft ends, a vibration motor having a weighted mass movable in a horizontal direction and deriving movement from the vibration of the loom, and means actuated by the motor to keep the weft ends taut.

8. In a weft replenishing loom having reserve bobbins from which extend weft ends, a lay, a vibration motor having a weighted mass movable in a horizontal direction perpendicular to the lay and deriving movement from the vibration of the loom, and means actuated by the motor to keep the weft ends taut.

9. In a weft replenishing loom having reserve bobbins from which extend weft ends, a lay movable back and forth in the loom, a vibration motor having a weight movable in a direction transverse of the lay, and means operated by the motor to keep the weft ends taut.

10. In a weft replenishing loom having reserve bobbins from which extend weft ends, a support fixed with respect to the loom but vibrating freely therewith, and means carried by the support and operated by free vibration of the loom to keep the weft ends taut.

11. In a weft replenishing loom having reserve bobbins from which extend weft ends, a support fixed with respect to the loom but vibrating freely therewith, and means carried by the support and operated by free vibration of the loom to keep the weft ends taut, said support being attached to the means at some point other than the center of gravity of said means.

12. In a weft replenishing loom having reserve bobbins from which extend weft ends, a pair of traveling surfaces having intersecting paths of movement defining between them an upwardly opening notch into which said weft ends may fall by gravity, and means dependent upon loom operation to move said traveling surfaces in directions to draw said weft ends downward through said notch to positions between said traveling surfaces.

13. In a weft replenishing loom having reserve bobbins from which extend weft ends, a vibration motor including a weight movable relatively to the loom, means operatively connected to the motor to keep the weft ends taut, and means to vary the amplitude of movement of the weight due to vibration of the loom.

14. In a weft replenishing loom having reserve bobbins from which to extend weft ends, a pair of traveling surfaces having intersecting paths of movement, means to support said surfaces so as to expose the upper part of each surface and so as to render said upper parts freely accessible from above, whereby the weft ends may fall on said upper parts, and means dependent upon loom operation to move said surfaces to draw said weft ends downward between said surfaces.

15. In a weft replenishing loom having reserve bobbins from which extend weft ends, means defining a pair of traveling surfaces portions of which engage the weft ends, said surfaces during their movement each intersecting the path of the other but at no time having contact with the other, and means dependent upon the operation of the loom to move said surfaces.

16. In a weft replenishing loom having reserve bobbins from which extend weft ends, a pair of substantially similar devices to engage the weft ends and bend the same to establish frictional contact therewith, each device having the weft-engaging portions thereof at all times loosely meshing with the weft-engaging portions of the other device, and means dependent upon the operation of the loom to move said surfaces.

17. In a weft replenishing loom having reserve bobbins from which extend weft ends, a pair of substantially similar devices which coact with the weft ends with which they contact to cause said weft ends to pass through a tortuous path, those portions of the devices which engage the weft ends at all times loosely meshing with each other, and means dependent upon operation of the loom to move said devices.

18. In a weft replenishing loom having reserve bobbins from which extend weft ends, a pair of devices each having a plurality of portions to engage the weft ends, the portions of one device moving in a path which intersects the path of movement of the portions of the other device, said portions at all times loosely meshing with each other and engaging the weft ends to give the same a tortuous form and to exert a tension on the same to keep them taut, and means dependent upon operation of the loom to move the portions of one device relatively to the other in a direction to straighten the weft ends.

19. In a weft replenishing loom having reserve bobbins from which extend weft ends, a pair of traveling surfaces having intersecting paths of movement, means dependent upon loom operation to move said surfaces, and means to support said surfaces so that those parts of said surfaces which approach each other will both move downwardly, whereby either surface on which a weft end falls will be assisted by gravity to move said weft end toward the other surface.

20. In a weft replenishing loom having reserve bobbins from which extend weft ends, a pair of traveling surfaces which intersect the path of movement of each other but do not contact with each other to engage he weft ends, and means operative while the loom is in operation to move said portions in a direction to straighten the weft ends.

21. In a weft replenishing loom having reserve bobbins from which extend weft ends, a pair of fluted tapered rolls having weft engaging portions which are out of engagement with each other but which co-act with the weft to give the latter a tortuous form and move in a direction to straighen the weft end, and means operative while the loom is in operation to move said rolls in a direction to straighten the weft ends.

22. In a weft replenishing loom having reserve bobbins from which extend weft ends, a pair of fluted rolls having weft engaging portions which co-act with the weft to give the latter a tortuous form and move in a direction to straighten the weft ends, said rolls being so disposed as to define between them an upwardly opening notch in which the weft ends may be placed, and means operative while the loom is in operation to move said rolls in a direction to draw said ends downward and to straighten said weft ends.

23. In a loom having a magazine of reserve bobbins from which extend weft ends, a pair of traveling surfaces having intersecting paths of travel, and means to support said surfaces so that the upper part of each surface is freely accessible from above, said surfaces having free end portions which extend from said supporting means in a direction away from the magazine.

24. In a weft replenishing loom having reserve bobbins from which extend weft ends, a pair of fluted rolls having free outer ends and having weft engaging portions which co-act with the weft to give the latter a tortuous form and which move in a direction to straighten the weft ends, the rolls defining adjacent the free ends a notch into which the weft ends may fall by gravity, and a guard capable of assuming a plurality of positions relative to the free ends of the rolls to determine which portions of the rolls shall be in operative relation with respect to the wefts.

25. In a weft replenishing loom having reserve bobbins from which extend weft ends, a pair of oppositely rotating tapered fluted rolls moving about substantially parallel axes, and a normally stationary thread engaging guard movable in a direction parallel to the axes to assume any one of a plurality of positions relatively to the rolls to determine which portions of the rolls shall be engaged by the weft ends, and means operative while the loom is in operation to rotate said rolls.

26. In a weft replenishing loom having reserve bobbins from which extend weft ends, a pair of oppositely rotatable fluted rolls having their axes transverse of the lay, means to rotate said rolls while the loom is in operation, said rolls being out of contact with each other and coacting with the weft ends to cause the latter to move through a tortuous path and tend to straighten the said ends.

27. In a weft replenishing loom having reserve bobbins from which extend weft ends, a pair of oppositely rotatable fluted rolls having their axes transverse of the lay, means to rotate said rolls while the loom is in operation, said rolls being out of contact with each other and coacting with the weft ends to cause the latter to move through a tortuous path and tend to straighten the same, and a notched guide to separate the threads in a direction along the length of the rolls.

28. In a weft replenishing loom having reserve bobbins from which extend weft ends, a pair of traveling belts movable in opposite directions, means operative while the loom is in operation to move said belts, and deflectors on each belt, the deflectors of one belt cooperating with those of the other belt to engage and dispose the weft ends in a tortuous path and to straighten the same between the deflectors and the reserve bobbins, the deflectors of one belt being at all times out of contact with the deflectors of the other belt.

29. In a weft replenishing loom having reserve bobbins from which extend weft ends, a pair of sets of moving deflectors each movable in a path independent of the other but intersecting the path of movement of the other, said deflectors moving in a substantially straight line during a portion of their travel to engage the weft ends and exert a relatively high tension thereon and cause the same to assume a tortuous form and exerting on said weft ends a force tending to straighten the same between the deflectors and the reserve bobbins.

30. In a weft replenishing loom having a lay and a plurality of reserve bobbins from which extend weft ends, in combination, a shuttle to receive one of the reserve bobbins and having tensioning means to resist unwinding of weft from said bobbin during the first pick after transfer, a pair of rotatable devices mounted in horizontally spaced relation to rotate about axes substantially parallel to the axis of oscillation of said lay and co-acting with the weft end of said bobbin in the shuttle to cause the same to assume a tortuous path and frictionally engaging said weft end to exert thereon a tension greater than that exerted by the tensioning means in the shuttle.

31. In a loom having a lay and a magazine of reserve bobbins from which extend weft ends, in combination, a pair of weft-holding rotatable members having co-acting weft-engaging surfaces, means to support said members in adjacent relation for simultaneous rotation about axes positioned in a substantially horizontal plane and substantially parallel to the axis of oscillation of said lay, and means actuated by free vibration of the loom for rotating said members.

32. In a loom, a plurality of reserve bobbins which as they await transfer tend to rotate on their axes under the vibrational influence of the loom and unwind their weft ends, and means actuated by free vibration of the loom to take up the slack in said weft ends and to hold said weft ends taut.

33. In a loom having a lay and a magazine of reserve bobbins from which extend weft ends, in combination, a pair of weft holding rotatable members having co-acting weft-engaging surfaces, means to support said members in adjacent relation for simultaneous rotation about axes positioned in a substantially horizontal plane and substantially parallel to the axis of oscillation of said lay, and means dependent upon loom operation for rotating said members, the upper portions of said members defining a weft-receiving notch, and said upper portions of both members moving toward said notch to induct a weft end between said weft-engaging surfaces.

34. In a weft replenishing loom, a magazine for reserve bobbins subject to slight vibration during loom operation resulting in rolling of the bobbins to unwind their weft ends, and a weft end slack take-up device dependent for its operation upon vibration of the magazine.

35. In a weft replenishing loom having a group of reserve bobbins from which extend weft ends, an element to have contact with the weft ends and movable in a direction to hold the ends taut, a weighted mass operatively connected to the element and capable when moved to cause movement of the element, and a movable support for the mass yieldingly connected to the latter, the support when vibrated causing a movement of the mass to move the element.

36. In a weft replenishing loom having a group of reserve bobbins from which extend weft ends, an element to have contact with the weft ends and movable in a direction to hold the ends taut, a weight operatively related to the element, a support for the weight subject to slight vibrational movement, and yielding connections between the weight and support to cause the weight to respond to movement of the support to effect movement of the element.

37. In a weft replenishing loom having a group of reserve bobbins from which extend weft ends, an element to have contact with the weft ends, and movable in a direction to hold the ends taut, a weighted mass operatively connected to the element and capable when moved to cause movement of the element and a movable support for the mass effective when vibrated to cause movement of the mass to move the element.

OSCAR V. PAYNE.